US006337846B1

(12) United States Patent
Bengston et al.

(10) Patent No.: US 6,337,846 B1
(45) Date of Patent: Jan. 8, 2002

(54) QUANTIFICATION OF THE QUALITY OF SPARE LINKS IN A TELECOMMUNICATIONS NETWORK

(75) Inventors: Lee Dennis Bengston, Murphy; Hal Badt, Richardson, both of TX (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/148,942

(22) Filed: Sep. 8, 1998

(51) Int. Cl.$^7$ ................................................ G01R 31/08
(52) U.S. Cl. ........................................ 370/216; 370/225
(58) Field of Search ................................ 370/216, 217, 370/221, 225, 227, 228, 252, 254, 255, 256, 389, 400, 401, 237, 224, 360

(56) References Cited

U.S. PATENT DOCUMENTS

| | | | |
|---|---|---|---|
| 4,648,088 A | 3/1987 | Cagle et al. | 370/224 |
| 4,825,206 A | 4/1989 | Brice, Jr. et al. | 340/825.02 |
| 4,853,927 A | 8/1989 | Wenzel | 370/218 |
| 4,884,263 A | 11/1989 | Suzuki | 370/225 |
| 4,956,835 A | 9/1990 | Grover | 370/228 |
| 5,070,497 A | 12/1991 | Kleine-Altekamp | 370/217 |
| 5,146,452 A | 9/1992 | Pekarske | 370/228 |
| 5,173,689 A | 12/1992 | Kusano | 370/225 |
| 5,189,662 A | 2/1993 | Kleine-Altekamp | 370/227 |
| 5,212,475 A | 5/1993 | Thoma | 340/2.4 |
| 5,218,601 A | 6/1993 | Chujo et al. | 370/228 |
| 5,233,600 A | 8/1993 | Pekarske | 370/228 |
| 5,235,599 A | 8/1993 | Nishimura | 714/4 |
| 5,319,632 A | 6/1994 | Iwasaki | 370/228 |
| 5,325,366 A | 6/1994 | Shinbashi | 714/712 |
| 5,435,003 A | 7/1995 | Chng et al. | 714/4 |
| 5,455,832 A | 10/1995 | Bowmaster | 714/712 |
| 5,479,608 A | 12/1995 | Richardson | 714/4 |
| 5,493,273 A | 2/1996 | Smurlo et al. | 340/541 |
| 5,495,471 A | 2/1996 | Chow et al. | 370/221 |

(List continued on next page.)

FOREIGN PATENT DOCUMENTS

| WO | 96/41440 | 12/1996 |
|---|---|---|
| WO | 97/48189 | 12/1997 |

OTHER PUBLICATIONS

Bouloutas et al. "Alarm Correlation and Fault Identification in Communication Networks"; 1994 IEEE Transactions and Communications.
Manione et al.; "An Inconsistencies Tolerant Approach in the Fault Design of Telecommunications Network"; Feb. 14, 1994.

Primary Examiner—Douglas Olms
Assistant Examiner—Brian Nguyen

(57) ABSTRACT

In a telecommunications network provisioned with a distributed restoration algorithm, the spare links via which disrupted traffic may be rerouted are categorized into different quality levels based upon their respective anticipated near term availability and reliability. There are a number of categories ranging from dedicated high quality spare links along fully functional spans to low quality spare links that act as replacements for multiple working links in the same span as the failed working link.

8 Claims, 5 Drawing Sheets

U.S. PATENT DOCUMENTS

| | | | |
|---|---|---|---|
| 5,537,532 A | 7/1996 | Chng et al. ..................... 714/4 |
| 5,548,639 A | 8/1996 | Ogura ........................ 379/221 |
| 5,586,112 A | 12/1996 | Tabata ........................ 370/225 |
| 5,590,118 A | 12/1996 | Nederlof ..................... 370/218 |
| 5,590,119 A | 12/1996 | Moran et al. ............... 370/225 |
| 5,598,403 A | 1/1997 | Tatsuki ....................... 370/221 |
| 5,623,481 A | 4/1997 | Russ ........................... 370/225 |
| 5,636,203 A | 6/1997 | Shah ........................... 370/244 |
| 5,636,206 A | 6/1997 | Amemiya et al. ......... 370/244 |
| 5,646,936 A * | 7/1997 | Shad et al. ................. 370/228 |
| 5,657,320 A | 8/1997 | Russ et al. .................. 370/217 |
| 5,680,326 A | 10/1997 | Russ et al. ..................... 714/4 |
| 5,710,777 A | 1/1998 | Gawne ....................... 714/717 |
| 5,721,727 A | 2/1998 | Ashi et al. .................. 370/244 |
| 5,734,687 A | 3/1998 | Kainulainen ............... 375/357 |
| 5,748,611 A | 5/1998 | Allen et al. ................. 370/221 |
| 5,748,617 A | 5/1998 | McLain, Jr. ................ 370/244 |
| 5,757,774 A | 5/1998 | Oka ........................... 370/242 |
| 5,781,535 A | 7/1998 | Russ et al. .................. 370/248 |
| 5,802,144 A | 9/1998 | Laird et al. ................... 379/32 |
| 5,812,524 A * | 9/1998 | Moran et al. ............... 370/228 |
| 5,832,196 A | 11/1998 | Croslin et al. ................. 714/4 |
| 5,838,660 A * | 11/1998 | Croslin ....................... 370/216 |
| 5,841,759 A * | 11/1998 | Russ et al. .................. 370/221 |
| 5,850,505 A | 12/1998 | Grover et al. ................. 714/4 |
| 5,852,600 A | 12/1998 | Russ ........................... 370/228 |
| 5,862,125 A * | 1/1999 | Russ ........................... 370/228 |
| 5,862,362 A | 1/1999 | Somasegar et al. ........... 703/21 |
| 5,867,689 A | 2/1999 | McLain et al. ............... 703/23 |
| 5,875,172 A | 2/1999 | Tabata ........................ 370/228 |
| 5,933,422 A | 8/1999 | Kusano et al. ............. 370/331 |
| 5,943,314 A * | 8/1999 | Croslin ....................... 370/216 |
| 5,991,338 A | 11/1999 | Trommel .................... 375/224 |
| 5,999,286 A | 12/1999 | Venkatesan ................. 359/114 |
| 6,026,073 A | 2/2000 | Brown et al. ............... 370/216 |
| 6,026,077 A * | 2/2000 | Iwata ......................... 370/254 |
| 6,044,064 A * | 3/2000 | Brimmage et al. ......... 370/248 |
| 6,049,529 A * | 4/2000 | Brimmage et al. ......... 370/248 |
| 6,104,695 A | 8/2000 | Wesley et al. .............. 370/216 |
| 6,108,309 A | 8/2000 | Cohoe et al. ............... 370/241 |
| 6,137,775 A | 10/2000 | Barlett et al. ............... 370/216 |
| 6,154,448 A | 11/2000 | Peterson et al. ............ 370/248 |
| 6,167,025 A | 12/2000 | Hsing et al. ................ 370/216 |

* cited by examiner

QUANTIFICATION OF THE QUALITY OF SPARE LINKS IN A TELECOMMUNICATIONS NETWORK

CROSS REFERENCE TO RELATED APPLICATIONS

The instant invention relates to the following applications having Ser. No. 08/825,440 filed Mar. 28, 1997, Ser. No. 08/825,441 filed Mar. 28, 1997, Ser. No. 09/046,089 filed Mar. 23, 1998, Ser. No. 09/148,944 entitled "Restricted Reuse of Intact Portions of Failed Paths", and Ser. No. 09/149,591 entitled "Signal Conversion for Fault Isolation". The respective disclosures of those applications are incorporated by reference to the disclosure of the instant application.

The instant invention further relates to applications Ser. No. 08/483,579 filed Jun. 7, 1995, Ser. No. 08/736,800 filed Oct. 25, 1996 and Ser. No. 08/781,495 filed Jan. 13, 1997. The respective disclosures of those applications are likewise incorporated by reference to the instant application.

This application is further related to the invention entitled "Method and Message Therefor of Monitoring the Spare Capacity of a DTNR Network" with Ser. No. 60/099,582, the disclosure of which being incorporated by reference herein.

FIELD OF THE INVENTION

This invention relates to telecommunication networks and more particularly to a method of quantifying the quality of spare links in a telecommunications network provisioned for distributedly restoring disrupted traffic.

BACKGROUND OF THE INVENTION

In a telecommunications network provisioned with a distributed restoration algorithm (DRA), when a failure occurs at one of the links or nodes of the network, traffic that is traversing across the malfunctioned link or node is disrupted. In response to such failure, a DRA network will find alternate paths for rerouting the disrupted traffic. The finding of such alternate paths depends on the availability of any spare links immediately after the detection of the failure. The distributed restoration algorithm provides for a real time assessment of the spare topology of the network so that the optimal alternate paths may be ascertained irrespective of the type of topology the network encompasses.

As spare links are found for forming the alternate paths, prior to the instant invention, all spare links are presumed to be equivalent in terms of subsequent reliability. But given that the DRA network acts very quickly following a failure and therefore does not have the time to monitor the integrity of the spare link for any length of time before switching the traffic, there are instances where a DRA provisioned network may select some restoration paths which may subsequently fail. If anything, by routing traffic onto a restoration path that does not have the requisite reliability, the disruptive effects of the original failure are compounded.

A method therefore is required for a network provisioned with a DRA to readily identify any links that may appear to be intact but in actuality are susceptible to failure shortly after the restoration switching has been completed. Putting it differently, there is a need to incorporate into the DRA of the network a method for determining the reliability of the spare links of the network.

SUMMARY OF THE INVENTION

To better determine the reliability of spare links in a DRA telecommunications network, the present invention enhancement to the DRA is a process whereby the spare links of the network are categorized according to their respective anticipated near term reliability. In particular, not meaning to be inclusive, the following categories are prescribed. Spare links that are a part of functioning spans are preferred over spare links in spans which include other links that have failed. Also, spare links that are meant to be dedicated replacement links for working links within the DTNR domain are preferred over those spare links that are able to be preempted by line protection systems, i.e., non-DRA protection switching.

Thus, as envisioned, a spare link in a span that is dedicated as a replacement link for failed working links inside the DTNR domain in a span not associated therewith would be quantified to have the highest quality. The next quality spare link is one that is also not in the same span as the failed link but is located within a span that has the potential to be preempted by a line protection system. Another category involves spare links that are a part of the span that includes a failed working link and that acts as a dedicated replacement for failed working links within the DTNR domain. The final category involves spare links that are a part of a span that includes a failed working link. These spare links are located within a span that may be preempted by a line automatic protection system. Note that all spares act as a replacement for any one of the number of working links.

To determine that a spare link lies within a partially failed span, the sender node of the DRA provisioned network would dispatch to all spare links connected thereto a special message or signal that indicates that it is a custodial node with respect to a failed span. This signal may be propagated as part of a C bit keep alive message in accordance with the aforenoted application Ser. No. 60/099,582. The other of the custodial nodes that receives the special message along a given spare link is provisioned to assume that the spare link is a part of the failed span. Further provisioned is the logic that within any span that has suffered partial failure, the remaining links have a high likelihood of subsequent failure. By extension, it is further contemplated that the following spare links are even more prone to subsequent failure: spare links within spans where only working links have failed, and spare links within spans where other spare links, in addition to working links, have failed.

It is therefore an objective of the present invention to catagorize spare links into different quality levels based upon their respective anticipated near term availabilities in a DRA telecommunications network.

It is another objective of the present invention to ensure that robust spare links be used to restore traffic subsequent to a failure in a DRA network so that the disruptive effects of a first failure are not magnified.

BRIEF DESCRIPTION OF THE FIGURES

The above-mentioned objectives and advantages of the instant invention will become more apparent and the invention itself will be best understood by reference to the following description of an embodiment of the invention taken in conjunction with accompanying drawings, wherein.

DETAILED DESCRIPTION OF THE INVENTION

Figure 1:
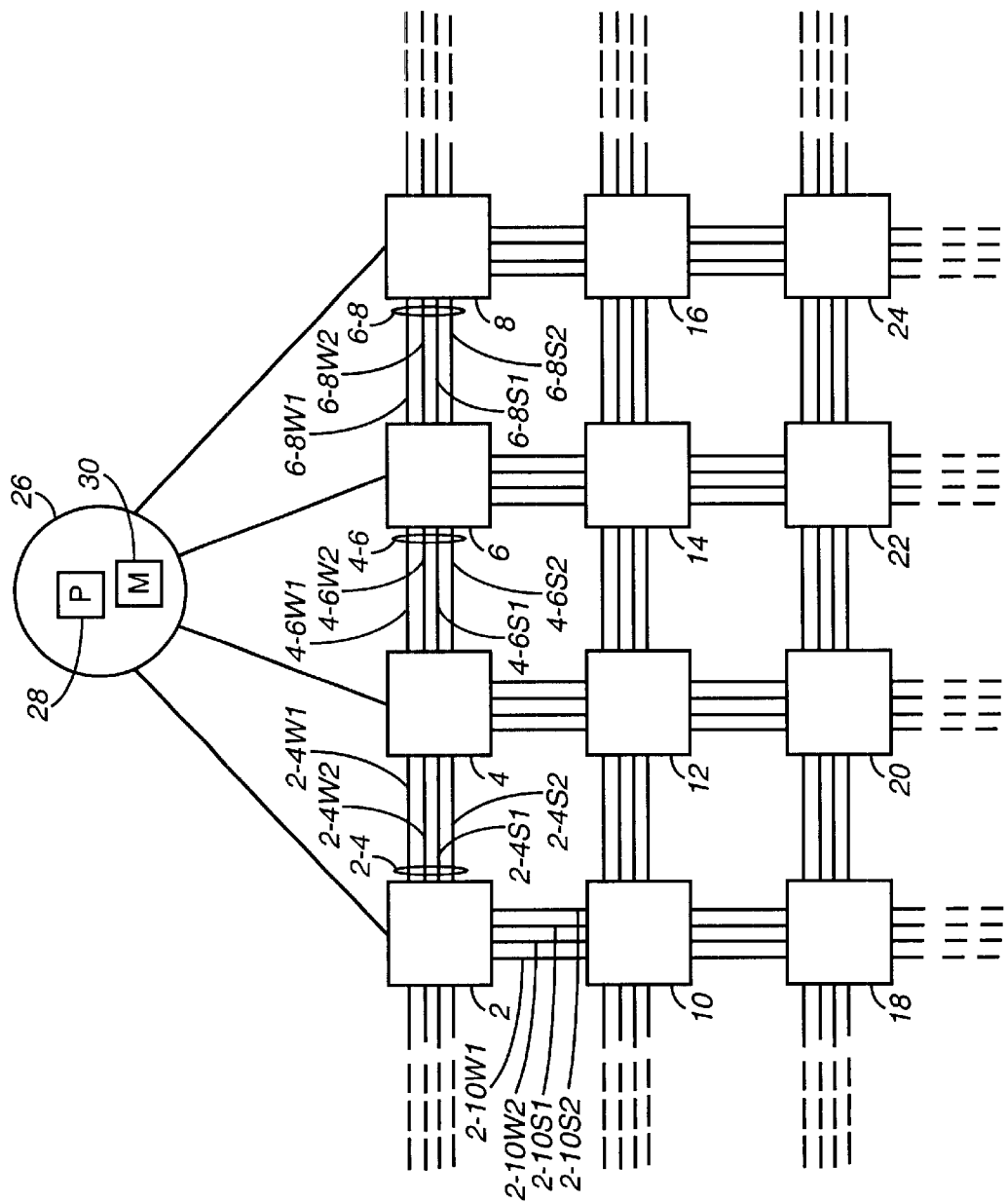
FIG. 1 is a schematic of an exemplar DRA telecommunications network.

A telecommunications network of the present invention, as shown in FIG. 1, includes a number of nodes 2–24 each cross-connected to adjacent nodes by respective spans such as 2-4 between nodes 2 and 4 and 4-6 between nodes 4 and 6. For the embodiment of FIG. 1, each of the spans includes a number of working links such as for example 2-4 W1 and 2-4 W2, and a number of spare links such as for example 2-4 S1 and 2-4 S2, for span 2-4. For the instant invention, assume that each node of the telecommunications network of FIG. 1 is provisioned with the DRA so that the network, as a whole, is a DRA provisioned network. Note, however, that in a real world network, only certain portions of that network may be provisioned with DRA while other portions are not. Those portions that are provisioned with DRA are referred to as dynamic transmission network restoration (DTNR) domains.

In the FIG. 1 network, there is an operations support system (OSS) 26, where the network management monitors and controls the overall operation of the network. Putting it simply, OSS 26 has an overall view, or map, of the layout of each node within the network. For the understanding of this invention, it suffices to say that OSS 26 has a central processor 28 and a memory store or database 30 in which the overall view map of the network may be stored. An interface unit, not shown, of OSS 26 enables OSS 26 to be communicatively connected to each of the nodes of the network. For the sake of simplicity, only the connections of nodes 2, 4, 6 and 8 to OSS 26 are shown.

Each of the nodes in the FIG. 1 network comprises a digital cross-connect switch such as for example the 1633-SX broadband cross-connect switch made by the Alcatel Network System company. In essence, each switch has a number of access/egress ports with their own IDs. In addition, each switch has a number of working links and spare and open links. These links may be in the form of fiber optic cables such as for example optical cable OC-12 links. There are SONET synchronous transport level-1 (STS-1) circuits in each of the OC-12 link. Thus, even though the circuits or links connecting the adjacent nodes in FIG. 1 are shown to have only one line, in actuality, there are a number of OC-12 links connecting the adjacent nodes. For the network shown in FIG. 1, as noted earlier, the links connecting adjacent nodes are deemed to be part of a span such as 2-4 or 4-6. Although one span is shown to connect adjacent nodes, in actuality, a node may have a number of spans connecting it to its adjacent nodes. In addition, instead of a span, other types of connection may directly connect two adjacent nodes.

For the embodiment shown in FIG. 1, assume that there are two working links, for example lines 2-4W1 and 2-4W2 between nodes 2 and 4, through which traffic traversing between nodes 2 and 4 is routed under ordinary circumstances. There are also shown in the FIG. 1 network two spare links, for example spare links 2-4S1 and 2-4S2 between nodes 2 and 4, connecting each pair of adjacent nodes. These spare links may be dedicated spare links in that each spare link is dedicated to act as a replacement link for DRA/DTNR restoration and cannot be preempted by any other system.

Alternatively, a spare link such as 2-4S1 may act as a protection link for any one of the working links. Thus, in the first instance, if working link 2-4W1 were to fail, the DRA process will select 2-4S1 as a replacement link so that all traffic that previously had been traversing across working link 2-4W1 will be routed across spare link 2-4S1. In the latter situation where a single spare link acts as a protection replacement link for all of the working links, that spare link will act as a replacement for any one of the working links when a failure occurs in any one of those links. Such spare link is referred to as a preemptible protect channel. Thus, for the embodiment of FIG. 1, if spare link 2-4S2 were a protect channel, then in the event that either one of working links 2-4W1 or 2-4W2 fails, spare link 2-4S2 will act as the replacement for either one of those failed links.

Figure 2:
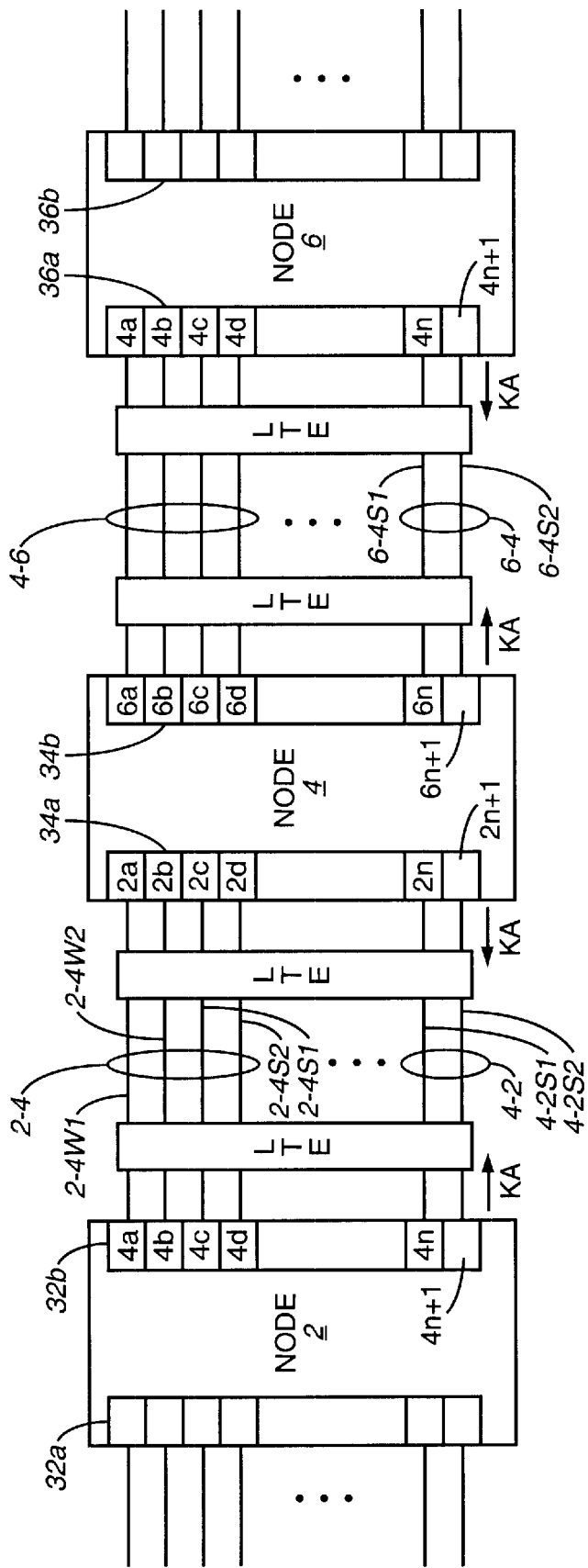
FIG. 2 is an illustration of a number of cross-connected nodes of the FIG. 1 network.

With reference to FIG. 2, a more detailed illustration of a number of adjacent nodes is shown. In particular, nodes 2, 4 and 6 are shown to be cross-connected to each other with nodes 2 and 4 and nodes 4 and 6 being respective pairs of adjacent nodes. As shown, each of the nodes has two sets of access/egress ports such as 32a and 32b in node 2, 34a and 34b in node 4, and 36a and 36b in node 6. Each of the access/egress ports is shown to include a plurality of individual ports such as for example 4a–4d and 4n–4n+1 in port 32b and 2a–2d and 2n–2n+1 in port 34a, etc. Note that the designation of the respective ports of the access/egress ports correspond to the number of its adjacent node. For example port 4a of node 2 is meant to be connected to port 2a of node 4. Conversely, port 2a of node 4 connects to port 4a of node 2.

Following the convention of FIG. 1, nodes 2 and 4 are connected by span 2-4 while nodes 4 and 6 are cross-connected by span 4-6. As before, inside each of the spans are a number of links, namely working links 2-4W1 and 2-4W2, and spare links 2-4S1 and 2-4S2. Note however that, as was stated before, although only 4 links are shown in span 2-4, in actuality, span 2-4 may have a much greater number of links.

As is well known, two line terminating equipment (LTE) are interposed between each pair of adjacent nodes, so that the links from each of the adjacent nodes are not directly connected to the opposed node. In fact, in practice, the LTEs may be connected by a number of spans such as for example a number of OC-48 lines, whereas each LTE is connected to its corresponding node by a number of OC-12 lines. Thus, even though the FIG. 2 embodiment shows only one span 2-4 cross-connecting nodes 2 and 4 and one span 4-6 cross-connecting nodes 4 and 6, in practice, there may be a number of spans cross-connecting each pair of adjacent nodes.

Further with reference to FIG. 2, note that each pair of adjacent nodes has a number of spans or links cross-connecting those nodes. For illustration purposes only, assume that nodes 2 and 4 are cross-connected by another span 4-2 while nodes 4 and 6 are cross-connected by a second span 6-4. Further assume that there are at least two spare links in each of those spans, namely 4-2S1 and 4-2S2 in span 4-2, and 6-4S1 and 6-4S2 in span 6-4.

Figure 3:
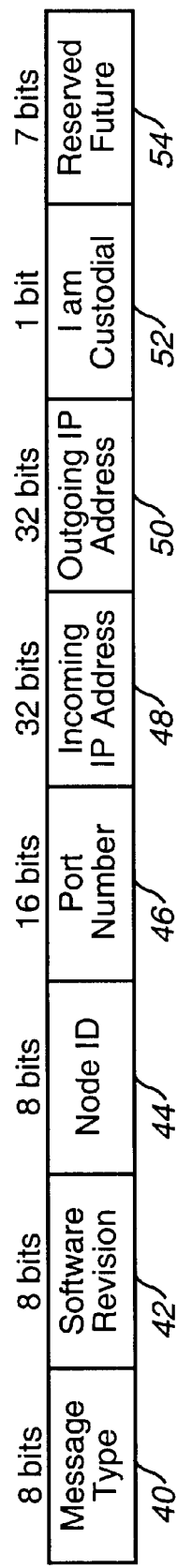
FIG. 3 is an illustration of the structure of an exemplar keep alive message used in the instant invention.

For the instant invention, each of the nodes of the network is provisioned to transmit or send to its adjacent node a special signal or message which, for the instant invention, may be referenced as a keep alive (KA) message. The structure of such keep live message is shown in FIG. 3, and a detailed discussion of the message is given in the aforenoted co-pending application Ser. No. 60/099,582, the disclosure of which being incorporated herein.

In particular, the keep alive message of FIG. 3 has an 8 bit message type field in which the type of message, mainly that it is a keep alive message, is designated. Field 42 is an 8 bit software revision field that includes the DTNR software revision number. Field 44 is an 8 bit node ID field that provides the DTNR node identifier of the transmitter node. Field 46 is a 16 bit field that provides the port number of the transmitting node once the keep alive message is sent. The incoming IP address field is designated 48. It is a 32 bit field that provides the IP address of the DS3 LTX port on the node that is used for half-duplex incoming messages. Field 50 is a 32 bit outgoing IP address field that provides the IP address of the DS3 LTX port on the node that is used for half-duplex of outgoing messages. The one bit I AM CUSTODIAL field 52 is set on all spare ports when a node is a custodial node for a failed link. The final field of the structure of the FIG. 3 keep alive message is a 7 bit reserved future field which, as its name implies, is unused currently and is reserved for future use.

In essence, a keep alive message enables a node that receives it to determine whether the message is sent by a custodial node of a failed working link or span. By setting field 52 of the FIG. 3 message to signify that the message is from a custodial node, if the node that receives the keep alive message is itself a custodial node, then it will assume that the particular spare link whence the message is received is a part of a failed span. From this, that spare link will be assigned a low quality value, as will be discussed in greater detail, infra.

Figure 4:
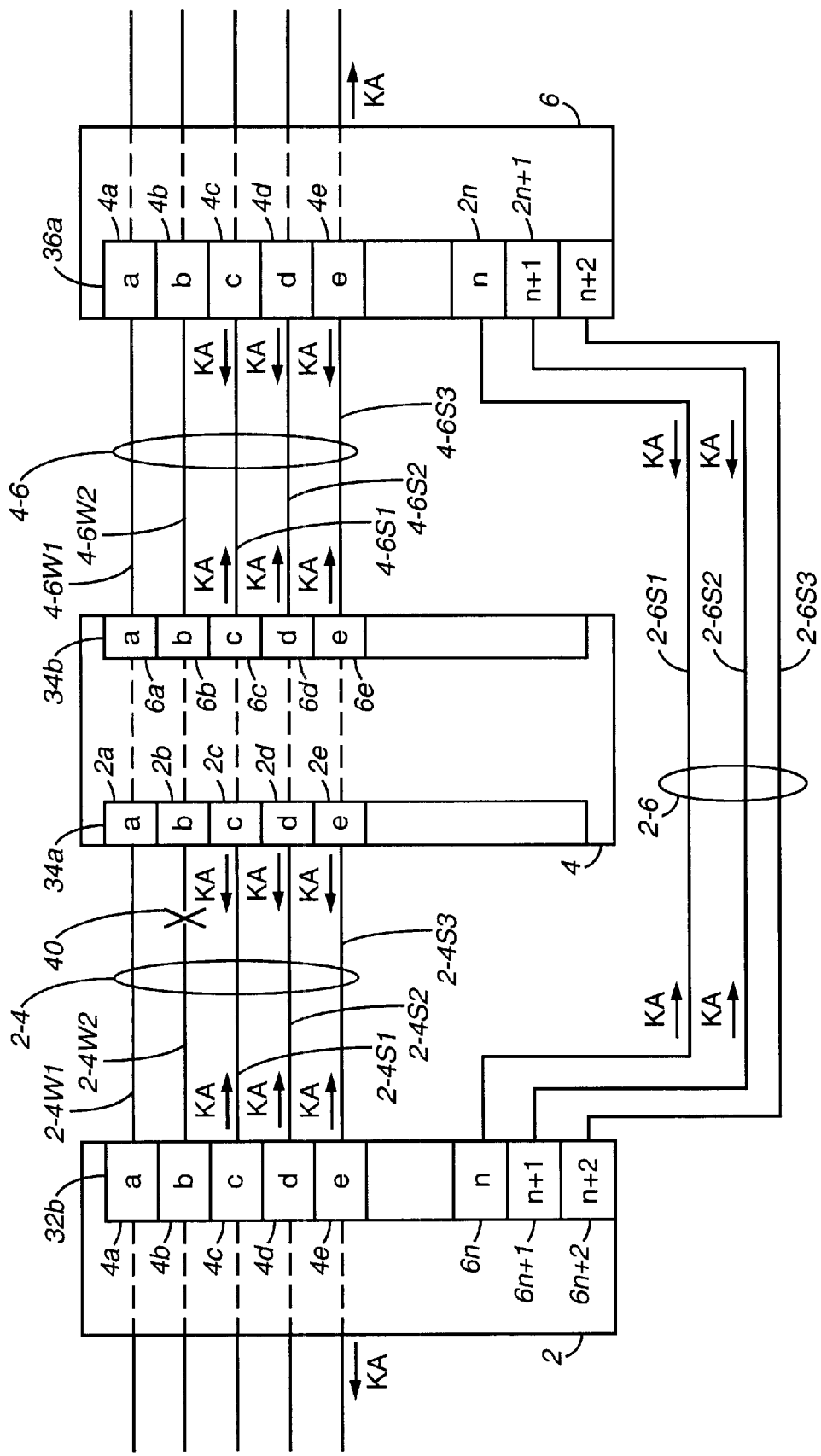
FIG. 4 is a more detailed illustration of a number of cross-connected nodes of the FIG. 1 network.

With reference to FIG. 4, note that each of the adjacent nodes 2, 4 and 6 has, at its corresponding access/egress ports 32*b*, 34*a*, 34*b* and 36*a*, a number of ports a–e to n–n+1 to which a number of links cross-connect the adjacent nodes. Similar to what was shown in FIG. 2, at least one span, namely 2-4 and 4-6, cross-connects adjacent nodes 2 and 4, and 4 and 6, respectively. With each of the spans there are a number working links and spare links such as for example 2-4W1, 2-4W2, 2-4S1, 2-4S2, 2-4S3 for span 2-4. Similarly, for span 4-6 that cross-connects nodes 4 and 6, there are a number of working links 4-6W1 and 4-6W2, as well as a number of spare links 4-6S1, 4-6S2 and 4-6S3.

For illustrating the principle of the instant invention, there is further illustrated in FIG. 4 an additional span 2-6 that cross-connects nodes 2 and 6. For illustration purposes only, span 2-6 is shown to include a number of spare links, namely spare links 2-6S1 and 2-6S2. Note that albeit only one span is shown to cross-connect adjacent nodes, in actuality, there may be a plurality of spans cross-connecting each pair of adjacent nodes. Thus, instead of a single span cross-connecting nodes such as 2 and 6, there may in actual practice be a plurality of spans cross-connecting nodes 2 and 6.

In any event, as shown in the FIG. 4 embodiment, for each of the spare links interconnecting a pair of nodes, keep alive (KA) messages are exchanged between those nodes. For example, for spare link 2-4S1, which cross-connects ports 4*c* and 2*c* of nodes 2 and 4, respectively, a KA message is transmitted from each of those nodes to its opposite, by way of ports c. Likewise, KA messages are exchanged between respective ports d and e of nodes 2 and 4, and respective ports c, d and e of nodes 4 and 6. So, too, KA messages are exchanged between nodes 2 and 6 along spare links 2-6S1 and 2-6S2 in span 2-6. As was mentioned previously, the KA messages enable each node that receives such KA message to recognize that the spare link whence the message is received is functional and ready to act as a replacement for a working link.

As shown in exemplar FIG. 4 embodiment, a failure has occurred at working link 2-4W2 cross-connecting nodes 2 and 4. As a result, whatever traffic that was traversing between nodes 2 and 4 via working link 2-4W2 is disrupted. Given that nodes 2 and 4 each are provisioned with a DRA, each of those nodes will begin the restoration process by designating node 2, for example the node having the lower number, as the sender node. At that point, node 2 will try to find an alternate path for rerouting the disrupted traffic, i.e., by finding available spare links that would act as replacement links for working link 2-4W2. The present invention provides the quantifying of the quality of the spare links that are available so that the alternate path or paths selected would have a low probability of suffering subsequent failure, so that the selected alternate path(s) would not be susceptible to failure shortly after the restoration has been completed.

For the instant invention, a number of presumptions are provisioned into the DRA for enhancing its decision in selecting which spare link to use for replacing a failed working link. Such assumptions are provisioned as categories that are based on how robust a spare link will remain subsequent to the completion of the restoration period. This anticipated near term reliability of the spare links is based on the following assumptions: that spare links along fully functional spans are preferred over links in spans where other links have failed; and that dedicated replacement links are preferred over those links that are potentially preemptable by automatic protection systems.

Based on these presumptions, the first category of spare links that is deemed to have the highest quality are those spare links that are dedicated as replacement for working links that are in spans that do not have any failed links. An exemplar spare link of this first category is for example spare link 2-6S2, which is a dedicated replacement for working links inside the DTNR domain. Ditto for spare link 2-6S1 of span 2-6 which is a replacement for DTNR working links. Note that spare links 2-6S1 and 2-6S2 are each replacements for working links which are not in the same span as those spare links. Thus, for the FIG. 4 embodiment, with working link 2-4W2 having malfunctioned due to failure 40, spare link 2-6S2 or 2-6S1 will act as a replacement for working link 2-4W2 so that whatever traffic traversing between nodes 2 and 4 via that working link will be routed to a spare link, so as to be directed to node 6 to therefore bypass failure 40.

The second category of spare links provisioned in the enhancement to the DRA of the instant invention is a spare link such as for example 2-6S3 in span 2-6 where the spare link is in a span that does not have any partial failure, and is being used as a preemptable protect channel for any one of a number of working links in a failed span, such as for example span 2-4. Thus, for the FIG. 4 exemplar embodiment, spare link 2-6S3 would act as a replacement for either working links 2-4W1 or 2-4W2, if either of those working links fails. The quality of such spare link in a separate span remains high.

The third category of spare links envisioned for the instant invention are those spare links that are dedicated to act as non-preemptable replacement for working links that reside in the same span as the spare link. Examples of such third category spare links are 2-4S1 and 2-4S2 of span 2-4. For the exemplar FIG. 4 embodiment, in view of failure 40, the traffic being disrupted by the failed working link 2-4W2 will be routed to spare link 2-4S2 or 2-4S1, if the spare links in span 2-6 are not available. For these third category spare links, the assumption is that those spare links would have a lower quality than the earlier discussed spare links insofar as those spare links are subjected to the same act that caused the failure in the working links with a much greater probability, since those spare links reside in the same span as the failed working link.

The next category of spare links that are available for rerouting disrupted traffic are those spare links that are not dedicated and instead are replacements for any of the working links that happen to fail and are potentially preemptable. An exemplar spare link in such category, as shown in the exemplar FIG. 4 embodiment, is spare link 2-4S3. This category of spare links is deemed to have a quality lower than any of the aforenoted categories. This category of spare links not only resides in the same span as the failure, but is preemptable by automatic protection switching systems.

To determine that a spare link is part of a span that contains a working link, the node that receives the KA message would read the message, and particularly the "I am custodial" bit to determine whether the message is sent from a custodial node. Thus, when a DRA sender node, such as for example node 2 of the FIG. 4 embodiment, broadcasts to all of its spare links the KA message that indicates that it is a custodial node of a failed span, more specifically failed working link 2-4W2 of the partially failed span 2-4, this KA message is interpreted by the receiving node to mean that there has been a failure in a span, and that one of the custodial nodes of the failed span is now giving notice that there is a failure, and that restoration is to begin.

In the case that the node that receives the KA message is the other of the custodial nodes of the failed span, such as for example the chooser node, it will assume that the given spare link whence the message is received is part of the failed span that connects it to the sender node. For example, upon receipt of the KA message at port 2d, node 4 will know that spare link 2-4S2 remains functional and could be used as a replacement for failed working link 2-4W2, from which it no longer is receiving any signal or message from node 2. Node 4 therefore will assume that span 2-4 is a partially failed span and that each of the spare links 2-4S1, 2-4S2 and 2-4S3 remains functional. Node 4 further could recognize that either of spare links 2-4S2 and 2-4S3 could be used as replacement for the failed working link 2-4W2, but that each one of those spare links is of low quality.

On the other hand, the KA messages being exchanged between nodes 2 and 6 inform each of those nodes that those spare links are functional spare links in a span that does not include any failed working links. Consequently, if spare link 2-6S2 is available, that spare link will be chosen as the replacement for a failed working link such as 2-4W2, since the former in the highest quality category. If spares of the highest quality are not available, the next best choice for acting as a replacement for failed working link 2-4W2 is spare link 2-6S3, which is a spare link that is provisioned to act as a protection channel. If spare link 2-6S3 is likewise unavailable, then the choice of a replacement for failed working link 4-2W2 dwindles down to either spare links 2-4S2 or 2-4S3 of the partially failed span 2-4.

Figure 5:
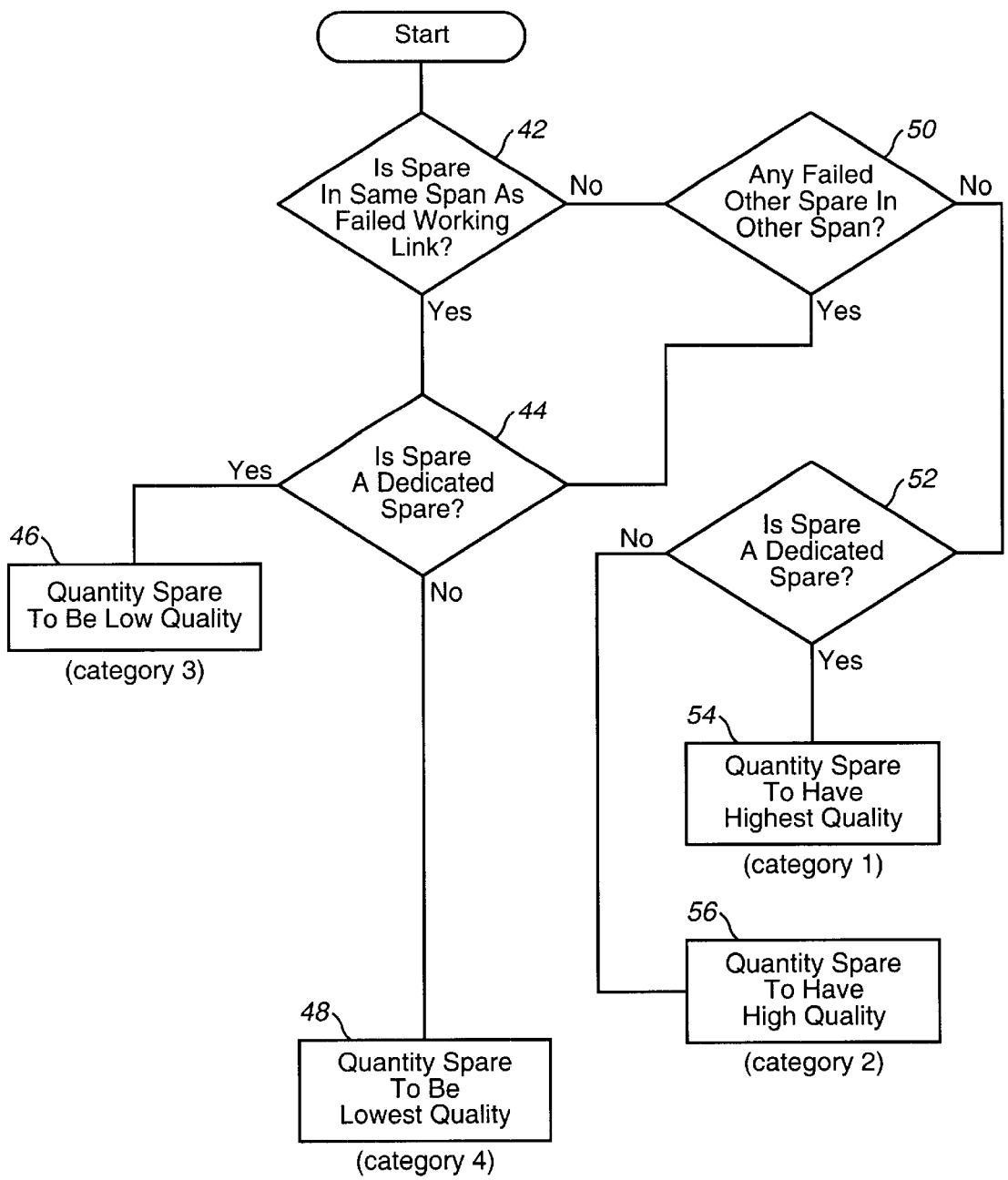
FIG. 5 is a flow chart illustrating the operation of the instant invention.

The operation of the enhanced DRA process of quantifying the quality of spare links of the instant invention is illustrated in the flow chart of FIG. 5. To begin, a determination is made in step 42 on whether the in issue spare link is in the same span as the failed working link. If it is, a further determination is made in step 44 on whether the spare link is a dedicated spare. If it is, then that spare is quantified to be a spare link of low quality, as reflected in step 46.

On the other hand, if the spare link is deemed not to be a dedicated spare, then the in issue spare link is quantified to be a spare link of the lowest quality per step 48.

Returning to step 42, if the in issue spare link is determined not to be in the same span as the failed working link, the process proceeds to step 50 to determine if there are any failed links in the same span as the in issue spare link. If there are, the process proceeds to step 44 whereby the in issue spare link is checked to see if it is a dedicated spare. If yes, that spare is quantified to be a spare link of low quality as reflected in step 46. If not, that spare is quantified to be of the lowest quality per step 48.

On the other hand, if it is determined per step 50 that there are no other failed links in the same span as the in issue spare link, then a further determination is made in step 52 on whether the in issue spare link is a dedicated spare link. If it is, that dedicated spare link is deemed to be of the highest quality, per step 54. If the in issue spare link is deemed not be a dedicated spare link per step 52, it is deemed to nonetheless be of high quality, per step 56.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the hereto appended claims.

I or we claim:

1. In a telecommunications network provisioned with a distributed restoration algorithm (DRA) having a plurality of nodes interconnected with spans including working and spare links, said nodes distributedly restoring traffic when a working link in said network fails by rerouting disrupted traffic onto at least one spare link, a method of determining the quality of the spare links adaptable for rerouting the disrupted traffic, comprising the steps of:

a) determining if a spare link connecting custodial nodes of a failed working link is a part of a failed span;

b) designating said spare link to be a good quality spare link if it is determined that it is not a part of said failed span and that it is adaptable to be used to replace any one of various working links contained in the same span as it is if any one of said various working links fails;

c) determining if said spare link is a link dedicated to be used by said any one working link for rerouting traffic disrupted due to a failure in said any one working link; and d) designating said spare link to be a high quality spare link if it is determined that said spare link is dedicated for rerouting traffic disrupted due to the failure of said any one working link.

2. The method of claim 1, further comprising the steps of:

designating a spare link associated with said failed span that is dedicated for rerouting traffic disrupted by the failure of said failed working link a low quality spare link; and designating a spare link that is used as a replacement link for any one of the working links in said failed span a lower quality spare link.

3. The method of claim 1, further comprising the step of:

quantifying a spare link associated with a failed span that includes at least one other spare link that has also failed to be of the lowest quality.

4. The method of claim 1, further comprising the steps of:

effecting one of said custodial nodes to transmit a special message indicative of a signal sent from a custodial node of said failed span onto all its spare links;

the other of said custodial nodes, upon receipt of said special message, assuming that said spare link from which said special message was sent is a spare link that is a part of said failed span.

5. A method of categorizing spare links of a distributed restoration algorithm (DRA) provisioned telecommunications network according to near term reliability of the spare links, comprising the steps of:

designating spare links along fully functioning spans to be reliable for rerouting traffic disrupted due to a failure in at least one of the working links of said network;

deciding a spare link to be a part of a failed span if said spare link carries a special message sent by one of the custodial nodes of said failure; and quantifying said spare link to be unreliable for rerouting disrupted traffic if said spare link is determined to be a part of said failed span;

provisioning said special message to include an indication that the special message is being sent along a spare link that is part of said failed span; and further provisioning said special message to include another identifier that the special message is sent by one of the custodial nodes of said failed span.

6. The method of claim 5, wherein, upon receipt of said special message, the other of said custodial nodes assumes that said spare link to be an unreliable spare link for rerouting the disrupted traffic.

7. A method of categorizing spare links of a distributed restoration algorithm (DRA) provisioned telecommunications network according to near term reliability of the spare links, comprising the steps of:

designating spare links along fully functioning spans to be reliable for rerouting traffic disrupted due to a failure in at least one of the working links of said network;

deciding a spare link to be a part of a failed span if said spare link carries a special message sent by one of the custodial nodes of said failure; and quantifying said spare link to be unreliable for rerouting disrupted traffic if said spare link is determined to be a part of said failed span, wherein the quantifying step comprises, quantifying the spare link that is dedicated to act as a replacement for a corresponding working link in said failed span to have a low reliability for rerouting traffic disrupted due to a failure of said corresponding working link, and quantifying the spare link that is to act as a replacement link for any one of the working links in said failed span to have a lower reliability for rerouting disrupted traffic.

8. A method of categorizing spare links of a distributed restoration algorithm (DRA) provisioned telecommunications network according to near term reliability of the spare links, comprising the steps of:

designating spare links along fully functioning spans to be reliable for rerouting traffic disrupted due to a failure in at least one of the working links of said network;

deciding a spare link to be a part of a failed span if said spare link carries a special message sent by one of the custodial nodes of said failure;

quantifying said spare link to be unreliable for rerouting disrupted traffic if said spare link is determined to be a part of said failed span; and quantifying a spare link that is to act as a replacement link for any one of the working links in a span that has at least another spare link that has failed to have the lowest reliability.

* * * * *